(No Model.) 2 Sheets—Sheet 1.
H. B. DIERDORFF.
MINING MACHINE.
No. 524,058. Patented Aug. 7, 1894.
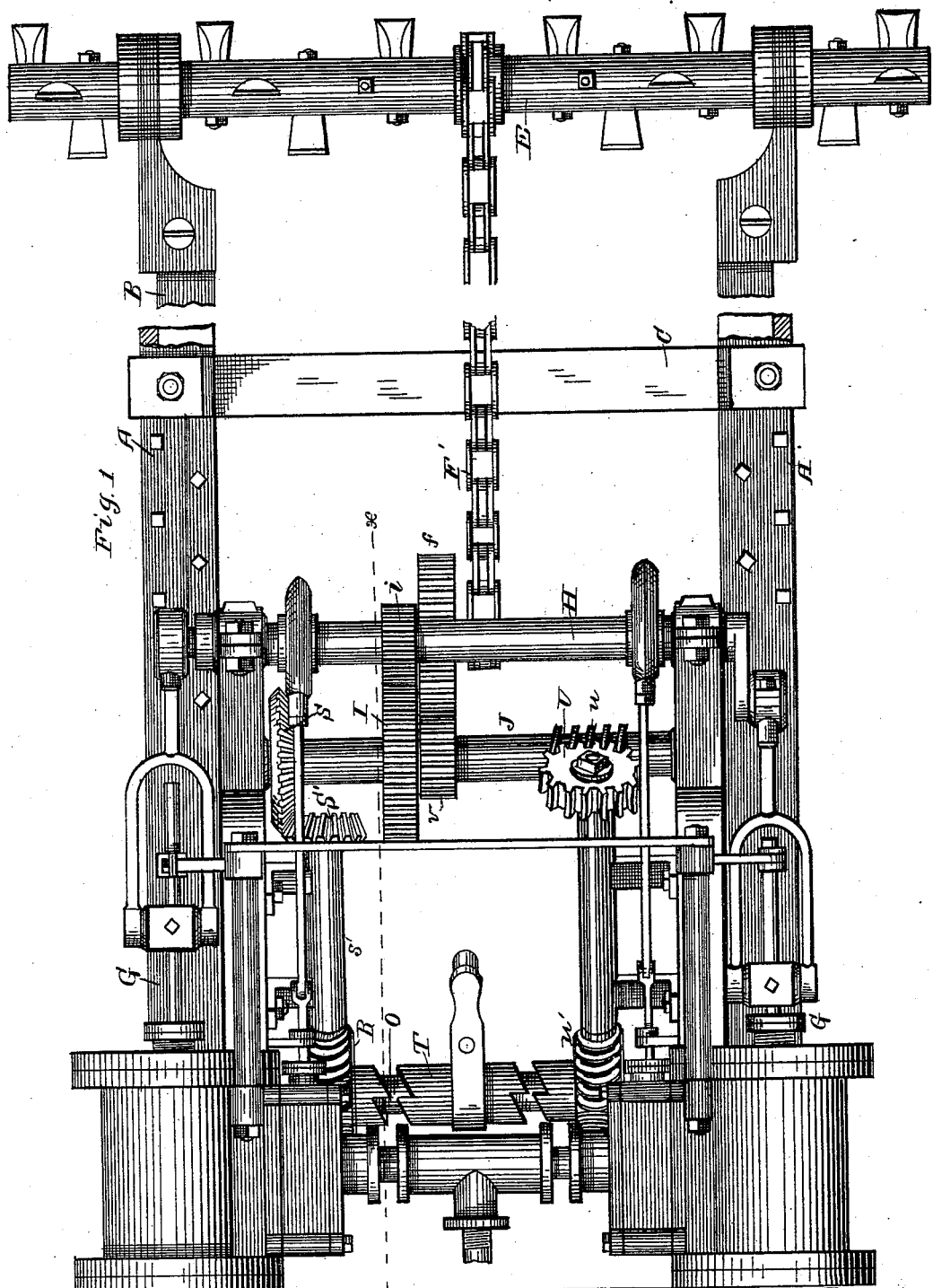
Witnesses:
J. C. Turner
B. W. Sommers
Inventor:
Henry B. Dierdorff
by Doubleday & Blissa atty

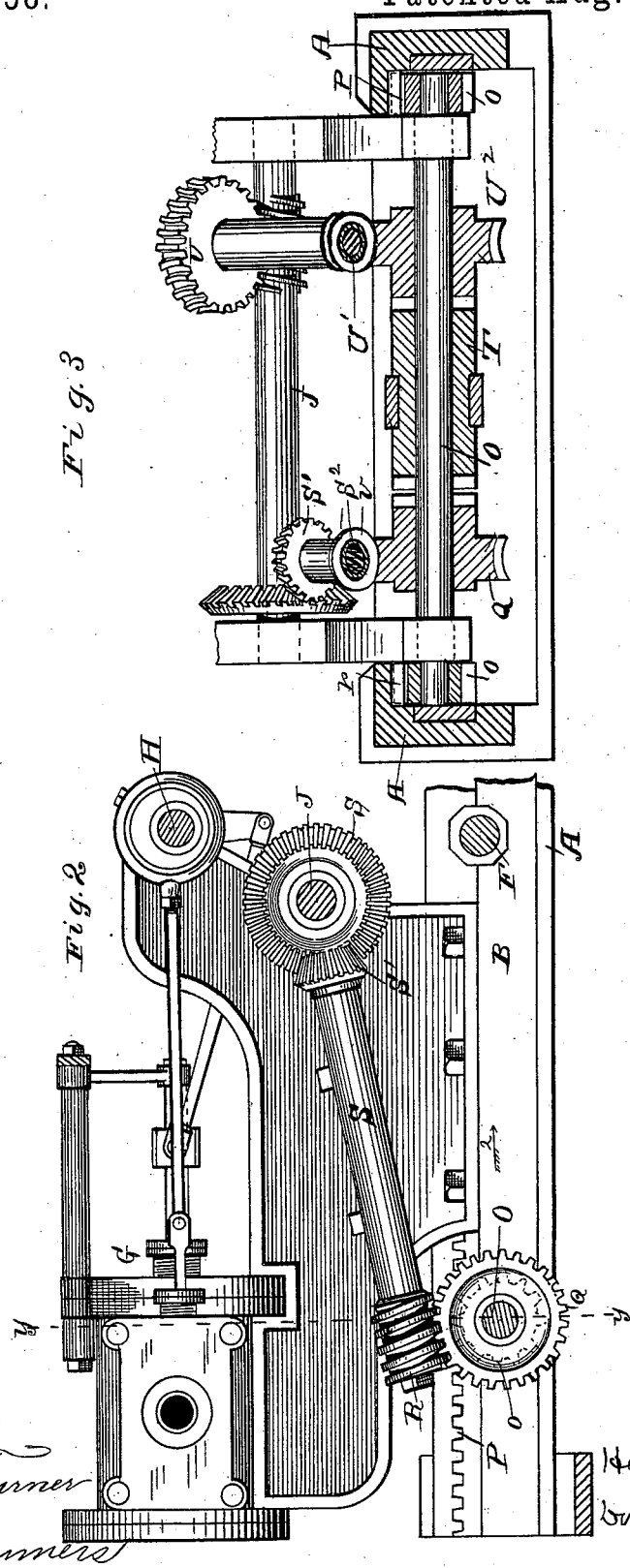

UNITED STATES PATENT OFFICE.

HENRY B. DIERDORFF, OF COLUMBUS, OHIO, ASSIGNOR TO THE LECHNER MANUFACTURING COMPANY.

MINING-MACHINE.

SPECIFICATION forming part of Letters Patent No. 524,058, dated August 7, 1894.

Application filed August 12, 1885. Renewed August 2, 1893. Serial No. 482,204. (No model.)

*To all whom it may concern:*

Be it known that I, HENRY B. DIERDORFF, a citizen of the United States, residing at Columbus, in the county of Franklin and State of Ohio, have invented certain new and useful Improvements in Mining-Machines, of which the following is a specification, reference being had therein to the accompanying drawings.

Figure 1 is a top plan view. Fig. 2 is a partial section, enlarged, on line $x$—$x$, Fig. 1. Fig. 3 is a transverse section on line $y$—$y$, Fig. 1.

As many of the general and minor features also of a machine of this sort are well known, it is unnecessary to describe or illustrate them all in detail. For a number of years machines have been known each of which had a bed, which while being portable from place to place, was capable of being made temporarily stationary by jacks or the like so that it could serve as a guide and an abutment; a carriage adapted to reciprocate on the bed; a cutter bar mounted transversely across the front end of the carriage in two bearings to distribute the reactionary strain uniformly on the longitudinal lines of the carriage and bed, the whole being arranged so that coal could be cut on lines parallel to the path of the carriage, the power being taken forward by one or more chains continuously actuated by an engine or power mechanism at the rear. It is not so much to any of these features, separately considered, that the present improvements relate, and hence, as said, it is unnecessary to amplify concerning them, said improvements relating rather to matters incident to the means for effecting the travel of the cutters during and after working, and to the parts which actuate them, and to the arrangement of the power or driving mechanism in relation thereto.

O is a shaft by which power is applied for the purpose of first advancing and afterward withdrawing the sliding frame or carriage and the cutters.

Pinion $i$ on engine shaft H rotates wheel I on shaft J, and pinion $v$ on shaft J rotates the wheel $f$ on shaft F.

Under some circumstances I find the mechanism heretofore used for withdrawing the cutters and the sliding frame has been objectionable, and I have devised and have herein shown an improved means for accomplishing this end.

At P there is a rack secured to the stationary frame, and the shaft O is provided with spur pinions $o$ adapted to engage with these racks, there being one of the latter on each side of the machine.

In order to so rotate the shaft O and pinions $o$ that they shall draw the sliding frame backward, that is to say, rotate them in the direction of the arrow 2, see Fig. 2, I secure to the intermediate shaft J a bevel wheel S preferably at about the point indicated in the drawings. With this a bevel pinion S' engages, which pinion is secured to the forward end of a shaft $S^2$, shown in section in Fig. 3. This shaft $S^2$ is mounted in a sleeve bearing $s$, which is supported upon a standard or upright piece secured to, or cast with, the sliding frame.

At the rear end there is a worm, or short hollow screw section R adapted to engage with a worm wheel Q, mounted upon the aforesaid shaft O. Said wheel is loose upon the shaft, but is adapted to be engaged therewith by means of the sliding clutch T, which is provided with teeth adapted to fit sockets in the wheel, although in lieu thereof any preferred form of clutch may be employed. The part T, shown, is secured to the shaft O by means of a feather or spline, which permits it to slide, but insures that it shall be rotated. This clutch part T can be engaged either with the devices which draw the sliding frame and the cutters backward, or, with those which force them forward, and with it, a shifting lever of any approved character may be combined.

It will be seen that when the part T is in engagement with the worm wheel Q, the parts S, S', $S^2$, and R will cause the shaft O and pinions $o$ to revolve in the direction of the arrow 2, and therefore compel the sliding frame or carriage to move backward, the motion being continuous and steady, and much superior to that attained by any of the devices within my knowledge which have been heretofore used.

The means for feeding or advancing the cutters and their frame or carriage are as follows, in the machine shown: U is a worm wheel driven by a worm $u$ on the shaft J, the wheel U being secured to a shaft U' which also carries at its opposite end a worm $u'$. The latter engages with a worm wheel $U^2$ secured to a shaft O. The clutch T lies between the worm wheels R and $U^2$, and can be engaged alternately therewith. When the engine is in motion, the wheel $U^2$ will be so revolved as to feed the sliding frame or carriage forward, the speed of advance being comparatively slow; but, as soon as the clutch is shifted into engagement with the wheel R (there being no reversal whatever of the engine) a high speed is imparted to the shaft O in the reverse direction, and the cutting parts are withdrawn rapidly from the coal.

To those acquainted with mining machines of this class the importance of the herein described improvements will be readily apparent. Heretofore one or the other of several plans have been followed for effecting the movement of the carriage, and in order that the advantages of my improvements may be more clearly understood, attention is called to the earlier ones.

First, as to the attempts to properly move the carriage which have been made in connection with machines of this particular class, that is, machines each of which has a transverse cutter bar at the front of the carriage, or what are known as the "Lechner" machines; and it was the serious, and in may cases, disastrous results reached in using them that led to my invention.

Originally the "Lechner" machines were provided with upright engines, a carriage-moving mechanism comprising a feed consisting of a nut on the carriage and a screw shaft on the bed, and a recede, or pull-back, mechanism consisting of a rope and drum, there being no reversible member in the carriage-moving mechanism, see the patent to F. M. Lechner, No. 186,854.

One of the features of the utmost importance in my invention was the entire reorganization in these respects resulting in the bringing of the engine and prime power shaft into close proximity to the feed and recede mechanism and to the chain driving shaft, so as to overcome the violent and disastrous vibrations and joltings due to the old arrangement of the power mechanism, and also resulting in having a continuously moving recede mechanism adapted to operate a reversible carriage-moving device without stopping the engine or experiencing any shocks or jars. Another proposed means for this is illustrated in British Patent No. 1,707 of 1876, which was exactly opposite to mine in this, that the power is initially imparted to the clutch on the highest speed shaft, and is taken from that to the feed wheel or to the recede wheel, and thence to the carriage-mover. The feed wheel and the recede wheel were not disconnected as mine are, but were permanently connected, and had to be reversed in their movements throughout both trains, when the clutch was shifted. I terminate the feed set of devices, and the recede set in disconnected, loosely mounted wheels on the slowest shaft, and take the power from them to the clutch, so that the reversing can be accomplished with the utmost ease. Another attempt made in these respects in connection with the "Lechner" machine is illustrated in the Patent No. 239,515, to F. M. Lechner, showing a machine having two long threaded shafts and two entirely independent nuts, there being no reversible part for the carriage-moving mechanism and the engine and power devices being situated, not on the carriage, but on the rear end of the bed. In consequence, the machines were weak, and applied power to the cutters, and to the feeding devices, with great disadvantage and loss, because of the cutters traveling away from the engine, they reaching ultimately a distance of fourteen feet, and the greatest power is needed when they are farthest advanced.

Subsequently another plan was tried, namely, using an intermittingly acting wheel (a ratchet wheel or equivalent) on the carriage-moving shaft O, and a vibrating dog actuated from one of the power shafts. But one machine of this sort was ever made, to my knowledge, as it proved absolutely impractical from the fact that the great weight of the carriage and the resistance to its movements from the slack or cuttings and other obstructions prevented the intermittingly acting recede devices from attaining the desired results. And still another plan consisted in having a chain extending from the chain shaft F back to the carriage shaft O. But to this, also, numerous difficulties were found to be incident. These machines must be small and compact, and it is therefore impossible to provide numerous wheels for changing speeds, and yet, at the same time, wide variations of speeds of the different parts are necessary. Thus, the crank shaft H will normally be making six hundred to a thousand revolutions a minute (a high speed engine being absolutely necessary to reduce weight) when at the same time the carriage shaft O cannot make more than from one to two or three revolutions a minute when going in one direction (to feed the cutters one-twelfth of an inch at each turn of the bar) and from ten to twelve revolutions when going in the opposite direction. The shaft J revolves at from three hundred to five hundred a minute, and the shaft F at from one hundred and fifty to two hundred and fifty. It will be seen that it is impossible to get the above mentioned speeds for shaft O by a chain from the shaft F unless one very small and one very large chain wheel are used, and such provision is impossible as the chain shaft must be near the ground and the space for the wheels is exceedingly limited. And if the speed of the carriage in receding is outside of a certain proportion to that of the cutters, the machine is liable to breakage due to the failure of the cutters and other parts to clean themselves, and such breakage is constantly occurring when this cause is present. When advancing, if the speed of shaft O is more than two revolutions, that is, if the cutters advance more than one-twelfth of an inch for each turn of the cutter-bar, the most powerful available engine will be stopped, or the cutters ruined. Finally, with respect to machines of this particular sort, an attempt was made to effect the receding of the carriage by employing a train of numerous spur wheels, one end of the series being connected to the carriage shaft, and the other to one of the power shafts. But experience showed that such a carriage-moving mechanism was also untrustworthy and liable to constant breakage, as it must be remembered that large amounts of relatively fine dust, slack, or cuttings are produced by the machine, and are drawn into, between, and among its moving parts, and the presence of every additional spur wheel greatly increases the liability of breakage. Moreover, the trains of gear wheels for reducing the high speeds of the forward shafts to the low speed of the carriage shaft had to be mounted upon studs or short shafts carried by the engine plates, and owing to the contracted space allowed, great difficulty has been found in providing the wheels with supports sufficiently rigid to withstand the high power which they are compelled to transmit from one to the other. All of these difficulties have been satisfactorily overcome by mechanism of the sort herein provided.

It will be seen that the wheels Q and U² are geared directly to their driving shafts S² and U', and the use of numerous fragile parts as chain links, ratchets and pawls, a long series of speed-reducing wheels or like connections, is successfully obviated, and the power is smoothly and economically transmitted to the wheels Q and N² without break or jar.

The worms R and $u$, rotating continuously, are self-cleaning, and breakage of them or of their wheels is avoided. And the limited toothed gearing which I employ can be elevated sufficiently to prevent the access of cuttings under ordinary circumstances, or the said worms R and $u$ can be actuated by driving worm gear at faster points.

Now, turning to machines of even remote characters, it will be seen that there are features of improvement and advantage incident to the present one when compared with them, in respect to the carriage-moving mechanism and the arrangement of the power parts for actuating it. In one machine, it was proposed to use a horizontal row of drills, and feed and recede them by a threaded shaft and a nut with a spur-toothed wheel arranged to slide longitudinally of the nut, with the expectation that it could be slipped from engagement with one wheel into peripheral engagement with another wheel, see British Patent No. 558 of 1865. Such mechanism for moving the carriage of a "front cutter-bar machine" would be worthless, for, as above stated, the exceedingly high speed demanded of the prime shafting (six hundred to one thousand revolutions per minute) would entirely prevent the slipping of a spur wheel from peripheral engagement with another, or into engagement with a third. Powerful friction engagement exists between the separable parts, which it is difficult to overcome in any machine, said parts experiencing the reactionary strain of from fifteen to twenty horsepower. Such sliding toothed wheels, as mechanics understand, require the stopping of the power to effect the reversing, as the gear wheels would be in danger of being stripped to pieces, otherwise. Again, in the drill machine referred to, the feed wheel, and the recede wheel, necessarily rotated at the same speed, as they were on drill shafts. Differently speeded wheels would have required the addition of still more gearing. And, too, they were necessarily mounted on different axes. By my construction, having the feed wheel and the recede wheel on the axis of the rotary carriage-moving member, and by rotating them continuously, oppositely, and with different speeds, I eliminate a large amount of machinery and provide a way for reducing the said high speed to two or three rotations a minute in the space of eighteen to twenty-four inches. The remaining class is typified in the chain cutter machine shown in the patent to Lechner, No. 295,183. In these, it is expected to rotate a long screw-shaft by wheels permanently stationary behind the rear end of the bed. The torsional strain, the loss of power, the unsteadiness of the parts, are so great that such carriage-moving mechanisms cannot be successfully used, and have not been, notwithstanding the several efforts that have been made, to my knowledge. In short, I believe myself to be the first to have provided these machines with a carriage-moving mechanism having a relatively stationary member, and a rotary reversible member on the carriage, a continuously rotating recede wheel secured to the carriage and applying power at a uniform distance from the cutters, and mounted on the axis of the rotary member, so that power could be quickly and without shock or resistance transferred to the carriage-mover with a single movement of a clutch lever; and a loosely mounted feed wheel arranged in combination with and in relation to the other parts shown and described, the parts being such as to attain the several ends set forth.

The very fact that various styles of machines have been known or proposed, such as those above referred to, shows that there can be more or less modification in the arrangement and construction of the parts.

The recede worm, related in arrangement and speed as it is, forms an important feature, in conjunction with the other parts, particularly with the opposing worm for the feed, because of the advantages referred to; they are self-cleaning; they apply powerful pressure, and, especially, maintain that pressure upon the carriage without liability of the "backlash," jolts and jars experienced when spur-gearing is depended on.

It will be seen that the power is most economically applied to these parts, as well as to the cutters, because of the arrangement of the engines in a substantially horizontal position, with the power shaft brought down close to the carriage and bed, these power parts constituting means for bracing and strengthening the carriage and the rotary devices secured thereto; matters forcibly appreciated by those practically acquainted with the older "upright" machines.

I do not herein broadly claim the following, to wit: The combination of the stationary bed, the carriage traveling thereon and carrying rotary cutting apparatus, said carriage having the engine shaft H, feed shaft U', recede shaft $S^2$, gearing as S S' and U $u$, and means for imparting longitudinal motion to said carriage from said feed shaft and recede shaft respectively; as I am aware that a mechanism of that character, broadly considered, has been used or proposed, as for instance, in the aforesaid British patent, No. 558 of 1865, and the Patent No. 239,515, to F. M. Lechner, dated March 29, 1881, and others. Nor do I make specific claim for a combination of devices for moving the carriage comprising a revolving thread on the carriage and a threaded bar, such as a worm rack bar, on the bed, as I have filed another application, to wit, Serial No. 197,558, April 2, 1888, relating specifically to such threaded carriage moving mechanism.

What I claim is—

1. In a mining machine, the combination with a stationary frame and the sliding frame, of the rack secured to the stationary frame, the reversible pinion engaging therewith, a continuously rotating power shaft the worm which revolves said pinion to withdraw the sliding frame, the beveled gearing S, S', which drives the said worm, and means driven by said power shaft for rotating the pinion in the opposite direction, substantially as set forth.

2. The combination with the stationary frame provided with a rack, the sliding frame provided with a pinion to engage with said rack for advancing and withdrawing the sliding frame, and the continuosly rotating power shaft of the shaft O, the worm wheel thereon, the worm which drives said wheel, the beveled gearing S, S', and the intermediate shaft which carries the wheel S, and is driven by said power shaft, substantially as set forth.

3. The combination of the stationary frame, the sliding frame, the rack upon one frame, and the pinion on the other, mechanism substantially as set forth for rotating the said pinion in one direction to advance the cutters and cutter frame, said mechanism being situated on one side of the central longitudinal line of the machine, and mechanism, substantially as set forth, upon the other side of the said line for withdrawing the cutters, it consisting of the worm gear and worm driven by the engine, said worm gear and worm being connected with the aforesaid pinion, substantially as set forth.

4. In a mining machine, the combination of the cutting apparatus, the carriage therefor, a carriage-moving mechanism having a rotary reversible member, two continuously rotating worms, means for alternately connecting said worms with the rotary member of the carriage-moving mechanism, a shaft rigidly secured to one of said worms, a shaft rigidly secured to the other, an engine, devices communicating relatively fast motion from the engine to one of said shafts, and devices communicating relatively slower motion from the engine to the other of said shafts, substantially as set forth.

5. In a mining machine, the combination of the cutting apparatus, the cutter carriage, the carriage-moving mechanism having a rotary reversible member, two continuously rotating, differently speeded worms, means for alternately connecting said worms to the rotary member of the carriage-moving mechanism, two parallel shafts respectively secured to the said worms, and arranged transverse to the axis of the rotary member of the carriage-moving mechanism, an engine, and means for transmitting from the engine different speeds to the said parallel worm shafts, substantially as set forth.

6. In a mining machine, the combination with the cutting apparatus, the carriage therefor, and the continuously rotating power shaft, of the carriage-moving mechanism having a rotary reversible member, two continuously rotatable wheels traveling with the carriage mounted loosely on a common shaft or axis and revolving oppositely with different speeds, two driving shafts geared directly to said wheels respectively (in contradistinction to ratchets, chains or like connections) and a clutch for imparting power from said wheels alternately to said member, substantially as described.

7. In a mining machine, the combination with the cutting apparatus, the carriage therefor, and a continuously rotating power shaft, of a carriage-moving mechanism having a rotary reversible member, two continuously rotatable wheels traveling with the carriage, mounted on the axis, but independent, of the reversible member, and revolving oppositely with different speed when in action, two driving shafts geared directly to said wheels respectively (in contradistinction to ratchets, chains, or like connections) and a clutch for imparting power from said wheels alternately to said reversible member, substantially as set forth.

8. In a mining machine, the combination with the cutting apparatus, the carriage therefor, and a continuously rotating power shaft, of a carriage-moving mechanism having a rotary reversible member, a relatively fast carriage-recede wheel on the carriage rotatable continuously on the axis of said member independently thereof, and detachably connected thereto at will, a shaft geared directly to said wheel (in contradistinction to chains, ratchets, and like connections) and a set of carriage-feeding devices adapted to impart at will an opposite and relatively slow rotation to said reversible member, substantially as set forth.

9. In a mining machine, the combination with the cutting apparatus, the carriage therefor, and the continuously rotating power shaft, of the carriage-moving mechanism having a rotary reversible member mounted on and traveling with the carriage, a carriage-recede wheel rotatable on the axis of said member independently thereof, and detachably connected at will thereto to give fast rotation to said member, a shaft geared directly to said wheel, (in contradistinction to ratchets, chains or like connections) and a supplemental set of carriage-feeding devices adapted to impart at will an opposite slow rotation to said reversible member, substantially as set forth.

10. In a mining machine, the combination with the cutting apparatus, the carriage therefor, and the continuously rotating power shaft, of a carriage-moving mechanism having a rotary reversible member, two wheels on and traveling with the carriage, rotatable continuously and oppositely on the axis of the said reversible member, each wheel being geared directly to a driving shaft (in contradistinction to ratchets, chains and like connections) and means for transmitting power from said wheels to said reversible member, substantially as set forth.

In testimony whereof I affix my signature in presence of two witnesses.

HENRY B. DIERDORFF.

Witnesses:
CHARLES W. MILLER,
T. M. LIVESAY.